No. 19,042. PATENTED JAN. 5, 1858.
G. M. PHELPS.
ELECTROMAGNETIC SPEED GOVERNOR.
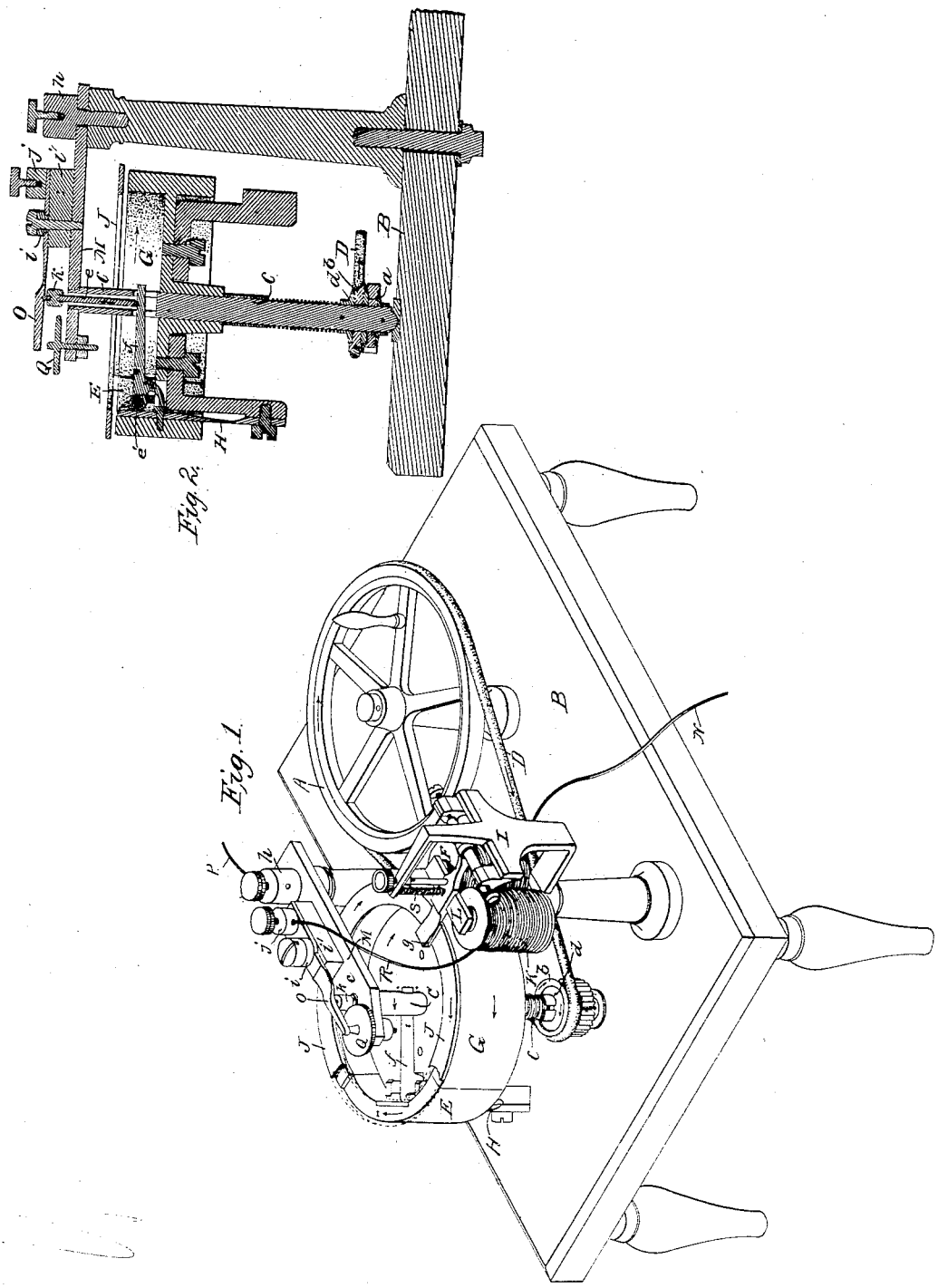

UNITED STATES PATENT OFFICE.

GEORGE M. PHELPS, OF TROY, NEW YORK.

IMPROVEMENT IN ELECTRO-MAGNETIC SPEED-GOVERNORS.

Specification forming part of Letters Patent No. 19,042, dated January 5, 1858.

*To all whom it may concern:*

Be it known that I, GEORGE M. PHELPS, of the city of Troy, in the county of Rensselaer and State of New York, have invented a new and improved mode of making a centrifugal or other speed governor or indicator of variable motion regulate the speed of the instrument or machine with or by which such governor is driven; and I do hereby declare that the following is a full, clear, and exact description of the same, reference being had to the annexed drawings, making a part of this specification.

The object of this invention is to make the speed-governor of a machine or instrument act with much power upon whatever mechanism or device is employed to change the speed of such instrument or machine whenever only an exceedingly minute change occurs in the speed of the governor; and my improvement consists in causing any suitable governor or indicator of variable motion to regulate the speed of the machine or instrument with or by which such governor or indicator is driven, by making the governor or indicator control and regulate, by closing and breaking the electric circuit, the motive action of a current of electricity upon an electro-magnet or other electro-magnetic device arranged to work or to regulate the action of whatever contrivance or mechanism is employed to change the speed of the instrument or machine, substantially in the manner hereinafter set forth, in contradistinction from making the governor or indicator, by its unaided power, operate the speed-changing device, and instead of making the governor control, by means of a valve, the motive action of a current of air or other fluid upon a piston or an analogous device arranged to work the speed-changing mechanism.

To enable others skilled in making electro-magnetic apparatus and speed-governors to make and practice my invention, I will now proceed to describe the application of my improvement by referring to the annexed drawings, in which—

Figure 1 is an isometrical projection of a centrifugal governor arranged according to my invention to make a shaft turning in fixed bearings, and driven by friction from a wheel turned by hand, run with uniform speed, which shaft may give uniform motion to an astronomical telescope, electric-telegraph instrument, or other light machinery; and Fig. 2, a partial sectional elevation of the same.

The same letters refer to like parts in both figures, and the arrows indicate the directions in which the parts move.

B is the table which supports all the parts.

A is the hand-wheel, and D a band for driving the shaft C by the friction of the loose pulley *b*, between the fast plate *a* and yielding one *d*, on said shaft. The pulley *b* is to be always driven faster than the standard uniform speed at which the shaft C is to run.

G is a balance-wheel fast on the shaft C. A segment, E, of the rim of the balance-wheel is made movable, and is an equivalent for the ball or balls of a common centrifugal governor, this segment E being mounted on the spring H, which is fastened firmly to the balance-wheel, so that whenever the segment flies outward or springs inward there is no friction in the parts which sustain the segment to impede even the most delicate centrifugal or centripetal movements thereof. The spring H presses the segment inward with such power that the centrifugal force of the segment when running at the required speed shall be just sufficient to overcome the inward pressure of the spring; but as the segment flies outward the power of the spring increases, so that with every increase of speed in the balance-wheel the segment flies only a little farther outward. The segment E gives a vibratory motion to the metallic spring-finger O by means of the lever *f*, which turns on bearings at *e e'*, and the rod *c* loose within the shaft C.

Instead of developing and applying the motive power of the electric current by means of an electro-magnet and armature, as shown, any other suitable electro-magnetic contrivance may be employed, and the electric current may be derived from any sufficient source, as from a galvanic battery or a magneto-electric machine, which latter may, in some cases, be driven by the power of the machine governed.

My improvement is applicable to various modes of driving the shaft C and changing its speed—for instance, that shaft may be run by gearing it with a train of wheels driven by a spring or descending weight, the friction-brake being applied whenever the speed of the shaft becomes too fast by the action of the electro-magnet or its equivalent; or the shaft C may only receive motion from a shaft or wheel running with greater speed than the shaft C by being occasionally connected with such driving-shaft by means of a friction-clutch operated by the electro-magnet or its equivalent whenever the speed of the shaft C needs quickening; or the shaft C may be driven by being constantly geared with a revolving shaft or train of wheels driven by a weight or other power which has not quite enough force to keep up the speed of the shaft C when running with the least resistance, and, in addition, being occasionally connected to a shaft or wheel which revolves faster than the shaft C, by means of a friction-clutch or other suitable device operated by the electro-magnet, or its equivalent, whenever the speed of the shaft C should be increased, the electric circuit being either closed or broken by the governor as the latter increases or decreases in speed, according as the electro-magnetic apparatus should be charged or discharged at such times; but these various modes of driving or changing the speed of the shaft C do not form any essential part of the improvement which I desire to secure by Letters Patent.

Although my improvement is applicable to most of the various kinds of speed-governors in use, as to the revolving fan-governor, whether running in air, water, or other fluid, to the various forms of chronometric and differential governors, to the pneumatic and the hydraulic pump or bellows governors, and to other known indicators of variable motion, yet I generally prefer to use the centrifugal governor; and the illustration hereinbefore given of the application of my improvement thereto will enable persons skilled in making such contrivances to apply my improvement to all other varieties of speed-governors with which it can be used; for, to whatever kind my improvement is applied, that part of the governor which owes its movement to a change in the speed of the machine with or by which the governor is driven is made to close and break the electric current which operates the electro-magnetic contrivance employed to work the friction-brake or whatever device is ultimately used to regulate the speed of the machine or instrument.

I am aware that electro-magnetic contrivances have been heretofore employed to retard and to accelerate the speed of machines and engines; but I believe that in such cases the actuating electric current has never been heretofore closed and broken by a speed-governor in order to make the machine or engine run with uniform speed.

What I claim as my invention, and desire to secure by Letters Patent, is—

Causing a centrifugal or other suitable speed-governor to regulate the motion of the machine or instrument with or by which such governor is driven by making the governor close and break a current of electricity which operates an electro-magnetic contrivance arranged to work whatever device or mechanism is employed to change the speed of the machine or instrument, as herein described.

GEORGE M. PHELPS.

Witnesses:
AUSTIN F. PARK,
JOHN MORAN.